Fig.1.

May 7, 1946.  A. W. PETT  2,399,938
CONTROL APPARATUS
Filed June 17, 1944  3 Sheets-Sheet 2

Inventor:
Alfred W. Pett,
By Ferd Bing
Attorney

Inventor:
Alfred W. Pett,
By: Ferd Bing
Attorney

Patented May 7, 1946

2,399,938

UNITED STATES PATENT OFFICE 2,399,938

CONTROL APPARATUS

Alfred W. Pett, Glencoe, Ill.

Application June 17, 1944, Serial No. 540,865

11 Claims. (Cl. 137—152.5)

This invention relates to control apparatus for governing the flow of fluids through closed conduits, pipe lines and the like, and particularly it relates to control apparatus for so regulating such fluid flow as to attain a constant output or rate of discharge from such a conduit.

Where a fluid such as a liquid or a gas is to be transmitted through a closed conduit or pipe line from the supply end thereof to the discharge or consumption end thereof, the fluid must, of course, be under a relative pressure head at the supply end so as to induce the desired flow through the line toward and to the discharge end. Under constant conditions of supply pressure and discharge pressure in a particular section of pipe line or conduit, the output would be constant, but in practice such constant characteristics in the flow-governing or controlling factors can be attained in but rare instances. In view of this, efforts have heretofore been made to provide means for variantly controlling the flow characteristics of lines or conduits so as to attain uniform or constant discharge from the conduit. The most common expedient employed for this purpose has included a power operated valve located in the conduit so that the setting of the valve may serve to vary and control flow or output of the conduit, and flow measuring or metering means in the conduit on either the input or output side of the valve have been associated with the valve so as to adjust the valve opening to correct undesired variations in flow detected by the measuring means or meter.

Such an arrangement is thus responsive only to the metered flow or output rather than being responsive to the controlling factors or conditions which govern and vary the amount of such flow or output, and hence, in order to attain the desired constant output or flow it has been necessary in prior installations of the aforesaid character to resort to relatively expensive and complicated mechanism. It is therefore an important object of this invention to enable flow of fluids in a pipe line or the like to be governed by means that are responsive to the variable factors that control the flow or output in such a pipe line; and an object related to the foregoing is to so correlate the means that measure such flow and the means that adjust such flow that the desired flow adjustment is effected without hunting or the like.

A further object of the invention is to enable measurement of flow in a pipe line to be accomplished by pressure differentials taken across the variable valve opening of an adjustable valve that governs flow in the pipe line, and a related object is to enable such differential pressures to cooperate with means constituting a measurement of the variable valve opening to effect or control adjustment of the valve. Further objects related to the foregoing are to render flow control means of the aforesaid character directly responsive to changes of supply pressure, and to effect the required valve adjustments prior to the time when such changes of supply pressure cause objectionable variations in the output or discharge of the line.

It is recognized that variations in the withdrawal of fluid from the output or discharge portion of such a pipe line often act to vary the pressure conditions in the line so as to disturb and vary the flow or discharge, and further objects of the invention are to enable such variations in demand or line pressure to exert a direct controlling action on the flow adjusting means; to utilize the supply pressure and the output pressure in the pipe line to govern the flow varying means; and to enable this to be accomplished by mechanism of a simple and compact character.

In prior devices where a pressure differential measuring means have been used as the metering means for governing the adjustment of a valve, the flow range over which such arrangements could be satisfactorily used has been relatively narrow, and it is a further object to enable such limitations to be eliminated, and a more specific object is to enable a flow control means for attaining constant flow to be used over a wide flow range. A further object is to afford such a flow control means that may be installed as a single unit in a pipe line or the like, thereby to simplify the employment of such flow control means, and a related object is to provide such a flow control means of a simple, compact and economical construction.

In the practical application or use of constant flow valve means of the kind to which this invention pertains, the constant flow control means is often utilized as a secondary control means that is variably adjusted under the dominating governing action of a primary control device that is responsive to the ultimate condition which is to be controlled by the system as a whole. As an example, a temperature responsive primary control device may be associated with a room, or a liquid storage tank to measure the temperature thereof, and such room or tank may be heated by a heating fluid that flows to the room or tank through a constant flow control valve means. If the setting of the constant flow control valve means happens to be such that the temperature in the room or tank varies beyond the desired range, the primary control device, which in this instance may take the form of a thermostat, exercises its control over the constant flow control valve means so as to adjust the constant throughput of the valve in accordance with the detected variation in the primary control condition as represented by the room or tank temperature. In other instances the primary control condition may constitute a liquid level or a pressure level or condition, and hence the nature of the primary control device associated with a constant flow control means may take many different forms.

In view of the foregoing it is a further object of the present invention to provide a constant flow control means that is particularly adapted for such association with a primary control device, and a related object is to provide such a constant flow control means that has a wide range of control operation, thereby to adapt the same for convenient use with a wide variety of primary control devices.

Other and further objects of the present invention will be apparent from the following description and claims and will be understood by reference to the accompanying drawings which, by way of illustration, show preferred embodiments and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

Figure 1:
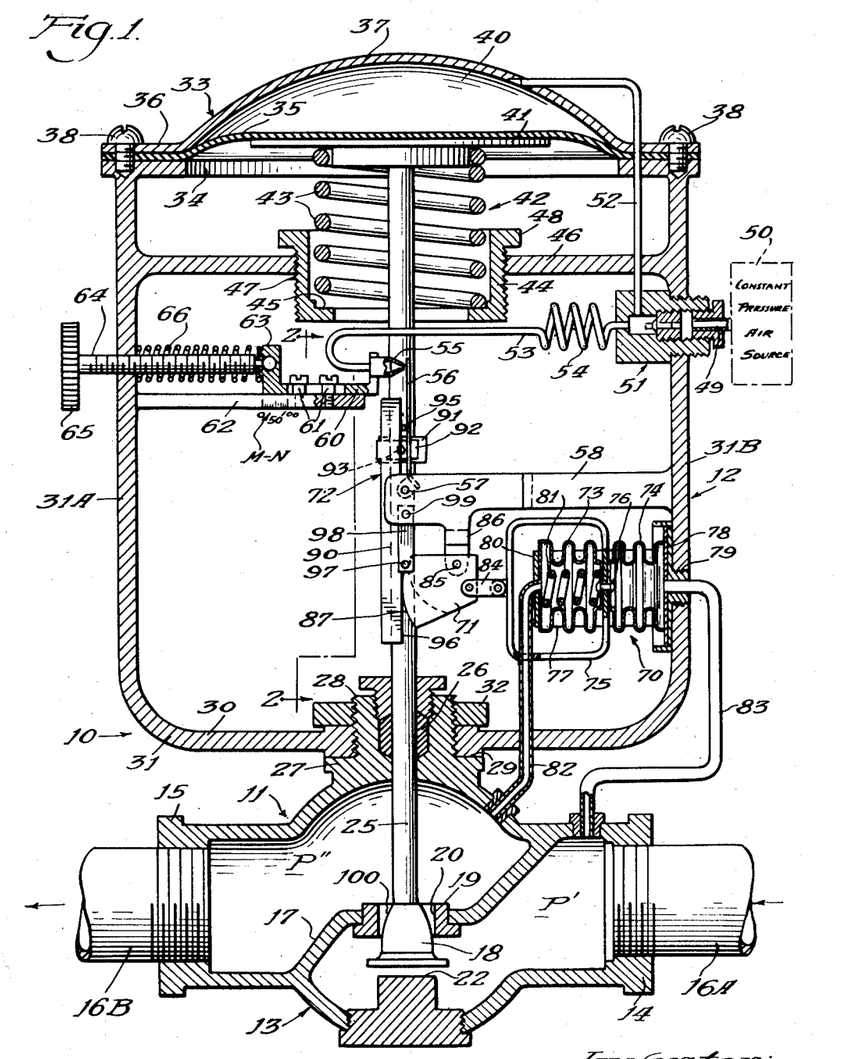
Fig. 1 is a vertical sectional view through a constant flow device embodying the features of the invention.
Figures 2, 3, 4, 5:
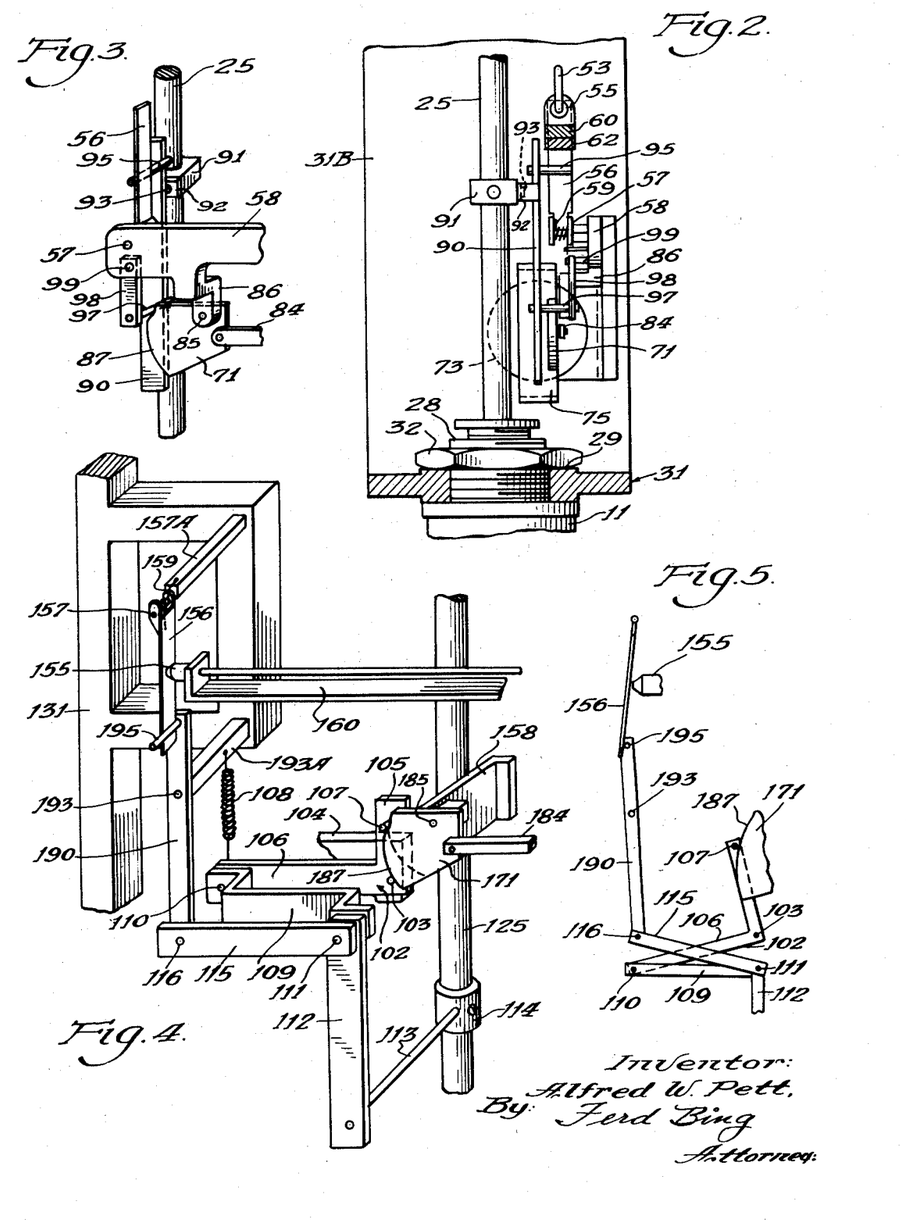
Fig. 2 is a fragmental vertical sectional view taken substantially along the line 2—2 in Fig. 1.
Fig. 3 is a fragmental perspective view of a part of the mechanism shown in Fig. 1.
Fig. 4 is a fragmental perspective view illustrating another form of control means for use in control devices of the present invention.
Fig. 5 is a fragmental view showing the control means of Fig. 4 with the parts thereof in different positions.

In the form chosen for disclosure in Figs. 1 to 3 of the drawings, the invention is embodied in a constant flow control unit 10 that includes a valve 11 and a flow measuring and valve adjusting mechanism 12 mounted on and operatively associated with the valve 11 to produce an adjustably predetermined constant flow of fluid through the valve 11. The valve 11 has a valve casing 13 having inlet and outlet ends 14 and 15 into which inlet and outlet sections 16A and 16B of a pipe line may be threaded, and generally diagonally of and within the valve casing 13 a division wall 17 is provided for cooperation with a valve member 18 in controlling flow of fluid through the casing 13. The division wall 17 has an opening therein in which a valve seat bushing or member 19 is mounted, and the valve member 18 is so related to the valve seat 19 that when the valve is in its upper position, the valve opening 20 in the bushing 19 is completely closed. When the valve 11 is to be opened the valve member 18 is moved downwardly, and its fully opened position is attained when the valve member 18 strikes a limiting abutment 22 formed within the valve casing 13. Such movement of the valve member 18 is attained through vertical or longitudinal movement of a valve stem 25 that extends upwardly from the valve member 18 and through a conventional packing gland 26 formed in a mounting boss 27 on the top of the valve housing 13.

The mounting boss 27 has a threaded nipple 28 formed thereon about the packing gland 26, the lower end of the nipple 28 being defined by a shoulder 29, and the transverse member 30 of a yoke 31 is threaded onto the nipple 28 and into abutment with the shoulder 29 and is held in place by a lock nut 32 threaded onto the nipple 28.

The yoke 31, as herein shown, serves as a support for the means that actuate and control the position of the valve member 18, and in the present instance the valve actuating means 33 are disposed at the upper end of the two spaced arms 31A and 31B of the yoke 31. While it will be understood that such valve actuating means 33 may take many different forms and may be arranged to utilize many different kinds of operating power, the present embodiment of the invention employs pressure fluid operated actuating means 33 that are operated by a pressure fluid such as air. Thus, as shown in Fig. 1 of the drawings, the upper ends of the arms 31A and 31B have a mounting ring 34 formed thereon so as to be concentric with the valve stem 25, and a flexible diaphragm 35 has its border portions clamped to the upper face of the ring 34 by the flange 36 of a downwardly concave cap member 37. Clamping screws 38 extended through the flange 36 and into the ring 34 are utilized in the present instance to effect such clamping, and thus a pressure chamber 40 is afforded between the rigid member 37 and the diaphragm 35. Hence by application of a pressure fluid to the chamber 40 the diaphragm 35 may be forced downwardly and such movement of the diaphragm 35 is utilized to actuate and control the position of the valve member 18. For this purpose the upper end of the valve stem 25 has a pressure plate 41 fixed thereon which bears against the outer or lower face of the diaphragm 35. The valve stem 25 is normally urged upwardly by a spring device 42, and in the present instance such device comprises an expansive coil spring 43 that surrounds the valve stem 25 and bears at its upper end against the lower face of the pressure plate 41. The lower end of the spring 43 is disposed within a supporting bushing 44 and bears upon an inturned flange 45 at the lower end of the bushing 44. The bushing 44 is supported on a transverse web 46 extended between the arms 31A and 31B, and to enable the upward pressure of the spring 43 to be adjusted, the bushing 44 is preferably threaded through the web 46 as at 47, and a non-circular flange or nut portion 48 is afforded at the upper end of the bushing 44 for effecting the desired adjustment of the spring 43.

It will be evident that the spring device 42 normally urges the valve member 18 toward its closed position, and when the valve is to be opened, fluid pressure may be applied to the pressure chamber 40 in an amount sufficient to impart the desired degree of opening movement to the valve member. Thus, as shown in Fig. 1, a pressure line 49, extended from a constant pressure air source 50, has a fitting therein affording a restriction 51, and from a point beyond the restriction, a branch line 52 is extended from such fitting to the chamber 40. The connection thus afforded tends to apply the full pressure of the source 50 to the chamber 40, the relationship between the pressure of the spring device 42, the area of the diaphragm 35 and the value of the pressure from the source 50 is such that the application of the full pressure of the source to the chamber 40 as aforesaid will fully open the valve 18. When, however, it is desired that the valve member 18 be disposed in an intermediate or partially open position, the air pressure in the branch line 52 beyond the restriction 51 is dissipated in such a way as to produce a resultant pressure in the chamber 40 that will cause the valve member 18 to be moved to the desired intermediate or partially open position and to maintain the valve member in the desired position.

The pressure dissipating means that is thus utilized to govern the effective air pressure in the pressure chamber 40 includes a vent line 53 extended from the restriction fitting 51 and formed to afford an extension coil 54 and terminating in a vent nozzle 55. The dissipation of pressure air from the nozzle 55 is governed by a flapper valve 56 that has its lower end pivoted at 57 on a horizontal mounting arm 58 extended to the left from the upright arm 31B as shown in Fig. 1. The flapper valve 56 is constantly urged in a counterclockwise direction, Fig. 1, by a torsion spring 59, and by its spacing from the nozzle 55, the flapper valve 56 may produce either an increase or decrease of the pressure in the chamber 40 to thereby open or close the valve member 18, or to maintain a particular pressure in the chamber 40 so as to thereby maintain the valve member 18 in a selected position.

As will hereinafter become apparent, the position of the nozzle 55 with relation to an arbitrary initial location such as that defined by a vertical plane passing through the axis 57 of the flapper valve 56 determines the value or quantity of the constant flow that is to be maintained through the valve 13, and means is therefore provided for adjusting the nozzle 55 in a direction perpendicular to said plane. In the embodiment of the invention shown in Fig. 1, such adjustment is attained manually and for this purpose the nozzle 55 is mounted on a slide 60 guided by positioning screws 61 for sliding movement on a horizontal web 62 extended from the vertical arm 31A. The slide 60 has an ear at its right hand end, Fig. 1, in which the nozzle 55 is fixed, while at the left hand end of the slide 60 an ear 63 has one end of an adjusting screw 64 rotatably secured thereto. The screw 64 is threaded through the upright arm 31A and has a knurled head 65. Thus by rotation of the screw 64 the position of the nozzle 55 may be adjusted, and to take up any lost motion in the adjusting means, an expansive coil spring 66 is disposed about the screw 64 so as to act between the ear 63 and the upright arm 31A.

Considering the desired constant flow that is to be maintained as being a selected percentage of the rated maximum flow for the valve 13, the nozzle 55 is first set or adjusted according to a percentage flow scale as will hereinafter be apparent, and governing means included in the control unit 12 are then operative to so control the flapper valve 56 that the valve member 18 is adjusted and readjusted as required to establish and maintain the percentage flow for which the nozzle 55 has been set. Such governing means are so constructed and arranged as to be responsive to those ultimate factors that tend to vary and control the flow through the valve 13, such factors being the effective opening or area of the valve opening 20 and the differential pressure that is effective across such valve opening.

Considered broadly, the means that are thus effective to control the flapper valve 56 constitute means for solving mechanically the equation of flow through an orifice or restriction in a pipe line, and for applying the results of such solution to the flapper valve 56 in such a way as to vary the setting of the valve 18 until the flow through the valve opening 20 equals the flow-quantity or percentage established by the setting of the nozzle 55. Thus, it will be recognized that, disregarding constants, the flow of a liquid through an orifice such as the orifice 20 is equal to the effective area of such orifice times the square root of the pressure differential across such orifice, and it is this formula or relationship that is solved and applied to the flapper valve 56 in the embodiment of the invention shown in Fig. 1.

In attaining such operation, pressure differential measuring means 70 are operatively connected across the valve orifice 20 and are associated with a square root cam 71 in such a way that the cam 71 affords a mechanical representation of the square root of the pressure differential across the orifice 20; and the cam 71 is associated with multiplying lever means 72 that are so related to the valve 18, the cam 71 and the flapper valve 56 as to effect the desired solution of the equation of flow together with the desired operation of the flapper valve 56.

It will be understood, of course, that the pressure differential measuring means 70 may take many different forms, but as herein shown, these means 70 comprise a pair of corrugated extensible bellows 73 and 74 that are arranged in an aligned relationship with a rectangular yoke 75 connected between the two bellows by means including a rivet 76. The assembly that is thus provided is mounted in a horizontally projecting relation on the upright arm 31B somewhat below the horizontal arm 58 and this is accomplished by a supporting bracket 77 that has one member 78 engaged with the right-hand end of the bellows 74 and connected as at 79 to the arm 31B. The bracket 77 also has a member 80 that engages the left-hand end of the bellows 73, and thus the two bellows are confined between the members 78 and 80 of the bracket 77. It will be observed that within the bellows 73, an expansive coil spring 81 is provided, such practice being conventional in devices for measuring differential pressure. The bellows 73 is connected to the valve casing 13 on the downstream side of the orifice 20 by means including a pressure tube 82 so as to apply the downstream pressure $P''$ to the bellows 73, while the bellows 74 is connected to the valve casing 13 on the upstream side of the orifice 20 by means including a pressure tube 83 so as to apply the upstream pressure P' to the bellows 74. Thus an increase in the differential pressure across the orifice 20 is represented by a movement of the yoke 75 in a left-hand direction as shown in Fig. 1, and such movement is transmitted to the cam 71 by means including a link 84. In the present instance the cam 71 is pivoted at 85 on a mounting arm 86 that is extended downwardly from the horizontal arm 57. Thus when the cam 71 is moved, due to increase in differential pressure, in a clockwise direction, the leading cam surface 87 of the cam 71 is rendered effective to afford a mechanical representation of the square root of the differential pressure that is effective across the orifice 20, and such mechanical representation constitutes one factor that is entered into the computation effected by the multiplying lever means 72.

The multiplying lever means 72 may take many different forms, but as shown in Fig. 1, such means includes a single lever 90 that is carried upon the valve stem 25 and is so mounted on the valve stem that it may be rocked by the cam 71. In mounting the lever 90 upon the valve stem 25, a mounting block 91 is fixed upon the valve stem, and a mounting ear 92 formed on the lever 90 intermediate its ends is pivoted to the block 91 by a pivot screw 93. The pivot 93 is so arranged as to be disposed in the vertical plane that passes through the axis of the valve stem 25 and the edge surface 96 of lever 90 passes through the center line of pivot 93. The vertical location of the pivot along the valve stem is such that when the valve number 18 is in its fully closed position the center of pivot 93 will be in alignment with the edge of a transmitting pin 95 that is fixed in horizontal position on the flapper valve 56 so as to be engaged with the edge surface 96 of lever 90. Thus when the valve is in its fully closed position, any rocking movement imparted to lever 90 will be ineffective to move flapper valve 56. When the pressure differential across the valve is zero as shown in Fig. 1, the edge surface 96 of lever 90 will be in a vertical plane that passes through axis of valve stem 25. In this position movement of valve stem 25 as valve opens or closes will not disturb position of flapper valve 56 because under such circumstances the edge surface 96 will move straight up and down. In this connection it should be observed that the valve 18 is shown partially open, even though there is no differential effective upon the differential measuring device 70, this positioning of the valve 18 being adopted in order to enable the details of structure to be more clearly illustrated. When, however, the valve member 18 has been moved to a partially open position, Fig. 1, a rocking movement of the lever 90 in a clockwise direction as viewed in Fig. 1 will serve to move the flapper valve 56 away from the nozzle 55, and it is such actuation of the flapper valve 56 in one direction or the other by or under control of the lever 90 that enables the desired controlling action to be attained.

The rocking movement of the lever 90 is imparted thereto by the cam 71, and in order that the cam surface 87 may act in a uniform manner upon the edge surface 96 of the lever 90, a transmitting pin 97 is provided, such pin 97 being carried in a laterally projecting relationship on the lower end of a link 98 that is pivotally suspended from the arm 58 by a pivot pin 99. The transmitting pin 97 is engaged on its right-hand side with the cam surface 87 and on its left-hand side with the edge surface 96 of the lever 90. It will be clear that with the structure thus described, the mechanical representation of the square root of the detected pressure differential will act on the multiplying lever 90 through the pin 97 and will set the lever 90 at an angle or slope that is dependent not only on the value of the square root of the pressure differential but is also dependent upon the vertical position of the valve stem 25, and in accordance with the angle or slope of the lever 90 and the vertical position of the valve stem 25, the lever 90 will engage the pin 95 so as to control opening and closing movement of the flapper valve 56.

Figures 6, 7, 8, 9, 10:
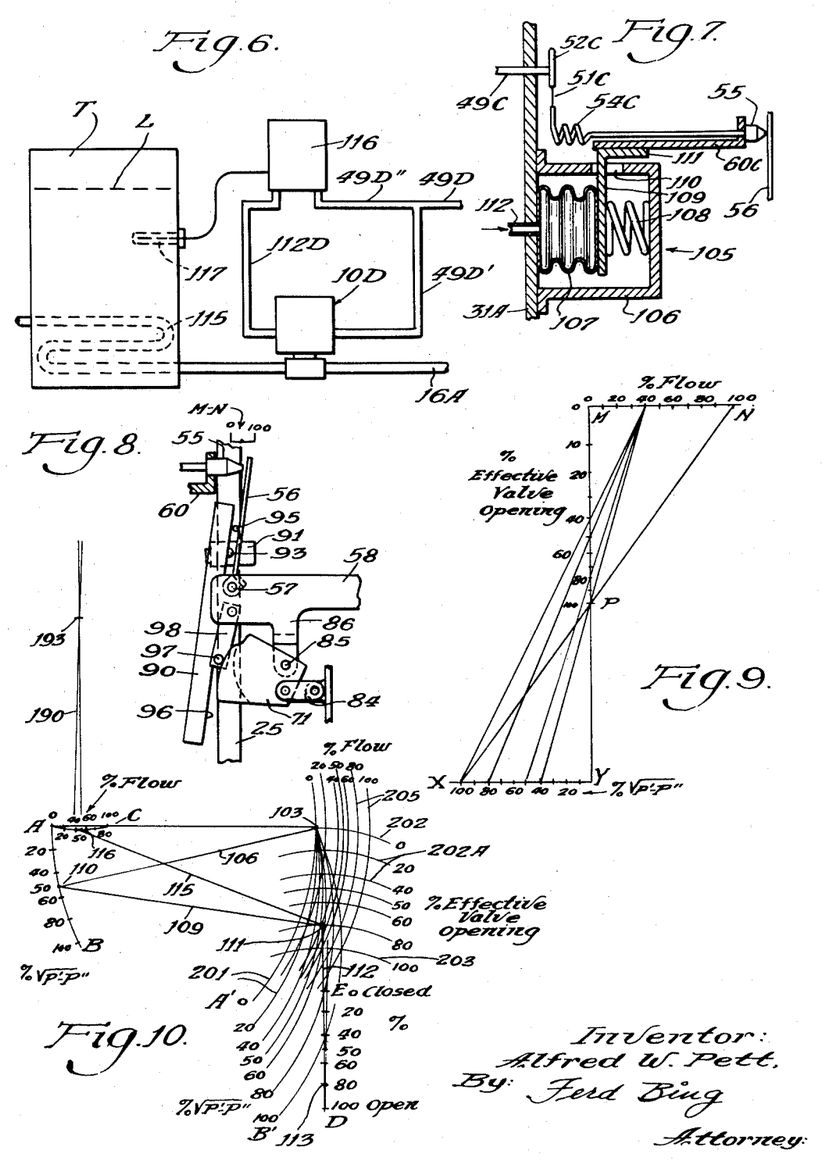
Fig. 6 is a diagrammatic view illustrating one use of the control unit of the present invention.
Fig. 7 is a vertical sectional view illustrating a portion of the mechanism included in the control unit of Fig. 5.
Fig. 8 is a fragmental view illustrating certain elements of Fig. 1 in different positions.
Fig. 9 is a diagrammatic view illustrating the relationships of certain of the elements of the control unit of Figs. 1 to 3.
Fig. 10 is a diagrammatic view illustrating the relationship of the elements in the embodiment of the invention shown in Figs. 4 and 5.

In attaining the desired interaction and computing cooperation of the various elements of the mechanism it will be evident that the various parts thereof must be coordinated as to form, proportion and relationship, and one simple way for determining such relationships in structure such as that shown in Fig. 1 is illustrated in Fig. 9 of the drawings. Thus the horizontal line X—Y in Fig. 9 represents the path of the pin 97 and is calibrated and graduated on a linear scale numerically from zero to 100 from right to left to correspond with the dimensions and form of the cam 71 to show the varying displacements of the pin 97 when different mechanical representations are rendered effective thereon by the cam 71. On the scale X—Y that is shown in Fig. 9, the values are representative of the square root of the pressure differential, but it should be pointed out that the scale employed may have characteristics other than linear, and may represent the differential directly rather than the square root thereof, as will hereinafter be described. Similarly, a horizontal line M—N is disposed so that the right-hand end Y of the line X—Y is connected by a vertical line M—Y with the left-hand end M of the line M—N; and the line M—N is calibrated and graduated numerically from zero to 100 from left to right in the manner hereinafter described to afford a percentage flow scale along which the nozzle 55 may be adjusted. The total valve stroke of the valve 18 is then measured off on the line M—Y to afford a point P thereon that represents the 100 percent open position of the valve 18, the closed position of the valve 18 being indicated at M. Then, by drawing a line from the "100" point on the scale X—Y through the "100" point on the scale M—P, and to the line M—N, the "100" point on the scale M—N is located; and similar lines extended from selected points on the scale X—Y through the "100" point on scale M—P will strike the line M—N so as to define similar values on the scale M—N. A scale may then be developed on the line M—P, and to do this, lines are drawn from the "100" point on the scale X—Y to selected points on the scale M—N, and the points where such lines intersect the line M—P define points on the scale M—P of values equal to the points to which such lines are extended on the scale M—N. The scale M—P that is thus developed may then be used in accordance with known practice to design the form of the valve member 18. The scale M—P reads downwardly from M and represents the amount of valve movement that is to be required to attain various percentages of effective valve opening in the orifice 20, and as applied to the valve member 18, the illustrated calibration scale formed on the line M—Y of Fig. 8 results in the provision of a curved face 100 on the valve member 18.

In the development of the various scales in Fig. 9, the scale along the line X—Y has been represented on a linear scale to indicate the values of the square root of the pressure differential, and this scale, in connection with the length of the valve stroke, has been used to develop the other scales that are employed. It should be recognized, however, that the various scales and the relationship therebetween may be developed and represented in different ways, the ultimate determining factor being that when such scales are incorporated in the mutliplying lever system and are associated with the pressure differential measuring means and with a valve member of a particular form and stroke, the lever system shall be capable of effecting a solution of the equation of flow so that it may calculate and manifest the instantaneous flow that takes place through the valve orifice by reason of detected values of the various factors that influence and govern such flow. It will be observed, however, in connection with Fig. 9, that by using scale on the line X—Y that linearly represents the values of the square root of the pressure differential, a linear flow scale is developed upon the line M—N, and for many uses such an arrangement is desirable, particularly where the adjustment of the desired flow is to be effected automatically by power means such as that illustrated in Figs. 6 and 7 of the drawings. In other instances it may be desirable to eliminate the square root cam that is employed in the embodiments herein shown, and to represent the values of the pressure differential, rather than the square root thereof, on the line X—Y. In such an instance, the development of the flow scale on the line M—N is accomplished in the same general manner as hereinabove described, and a relatively complex calibration of the flow scale M—N will result in this instance. Another way in which the various scales may be developed is by first laying out the flow scale and the valve stroke, and then developing the other elements or scales from the factors that are thus afforded. For example, the character of an automatic control means that is to adjust the setting of the nozzle 55 may be such that it is desirable to have a parabolic flow scale on the line M—N, and a generally similar procedure may be employed in such an instance to develop the scales M—P and X—Y on the basis of such a parabolic flow scale and the valve stroke. The form of the valve member and the shape of the cam are then calculated in accordance with the scales that are thus developed. Thus it will be evident that the character of the basic scales that are used is immaterial so long as the resulting lever system and the pressure differential measuring means cooperate with the valve member to effect an accurate calculation of the instantaneous flow resulting from the controlling factors that are measured and applied to the lever system.

The control means that are thus provided are effective in accordance with the pressure differential across the orifice 20 to adjust and readjust the valve member 18 to produce and maintain the desired percentage flow through the valve as established by the setting of the nozzle 55. In this connection it should be observed that in the course of any adjusting movement of the valve member 18, the resulting change in the effective area of the orifice 20 produces a change in the pressure differential, but with the control means of the present invention, such progressive variation of the pressure differential becomes immediately effective to gradually change the slope of the lever 90. Thus as the adjustment of the valve member 18 progresses, the elements of the computing means move gradually toward the desired balanced relationship wherein the flapper 56 is in its normal relation to the nozzle 55, and when such a normal relation is attained, the valve member 18 is held in a stationary adjusted position that will produce the desired flow through the valve. While the aforesaid "normal" position of the flapper 56 has been described as being a predetermined distance from the end of the nozzle, there is in practice a slight variation in such spacing as different effective pressures are maintained in the pressure chamber 40, and such "normal" position should therefore be considered as the position or spacing of the flapper 56 that prevents further change of pressure in the chamber 40 and prevents further adjusting movement of the valve 18.

The novel cooperation of the elements of the computing or control means of this invention may best be illustrated by a consideration of the two conditions that are met in the actual use of the control device. Thus, where the nozzle 55 is set for a forty percent flow, as shown in Fig. 8, it may be assumed that a particular upstream pressure P' and a particular downstream pressure P" have produced a differential pressure that has resulted in a particular location or adjustment of the valve member 18. So long as the same pressure differential remains effective, the elements of the control means will remain in the same relationship and the valve member 18 will remain in the same adjusted position. This pressure differential may, however, be disturbed by a variation in either the upstream pressure P', or the downstream pressure P", or both, and such a disturbance of the differential pressure may result in either an increase or a decrease in the differential pressure. Considering first the situation where there is an increase in the differential pressure, it will be evident that when this occurs, the cam 71 will be rotated in a clockwise direction, thereby to rock the lever 90 in a clockwise direction about its pivot 93. The upper end of the edge surface 96 of the lever 90 is therefore effective upon the flapper 56 to move the flapper 56 from its normal relationship with respect to the nozzle 55 and further away from the nozzle. Such opening movement of the flapper 56 causes an increased dissipation of pressure from the chamber 40 with the result that the valve member 18 is moved gradually toward its closed position. As such upward or closing movement of the valve 18 progresses, the pivot point 93 of the lever 90 is moved upwardly, and assuming that the cam 71 remains in the same position, this serves to increase the slope of the lever 90. Such an increase in the slope of the lever 90 causes the flapper 56 to move gradually back toward what may be termed its normal relationship to the nozzle 55, and when this normal position is reached, the reduction in pressure in the chamber 40 will be terminated and the valve member 18 will be stopped in a newly adjusted position. It has been pointed out hereinbefore, however, that as the valve member 18 is closed, the reduction in the effective area of the orifice 20 tends to increase the pressure differential that is effective across this orifice, and in the valve closing movement of the valve member 18 as above described, there will, of course, be such an increase in the pressure differential. This takes place, of course, in a gradual manner and causes a slight further movement of the cam 71 in a clockwise direction as the closing movement of the valve member 18 progresses, and hence the computing action of the lever system exercises a continuing control on the flapper valve 56 so as to cause the adjusting movement of the valve member 18 to terminate in such a relationship that the desired flow percentage through the valve 13 will be attained.

Under other conditions, the change in the effective pressure differential across the orifice 20 may be such as to reduce such differential, and in such an instance, the cam 71 is moved in a counterclockwise direction so as to increase the slope of the lever 90. This causes the flapper 56 to move from its normal position toward the nozzle 55 with the result that the dissipation of pressure from the chamber 40 is reduced. This produces an increased pressure in the chamber 40 so as to apply opening pressure to the valve member 18. Such opening pressure causes downward movement of the valve member 18, and as a result, the pivot 93 of the lever 90 is moved downwardly. This tends to decrease the slope of the lever 90 and as this occurs the lever 90 acts on the pin 95 to move the flapper 56 gradually away from the nozzle 55. As such movement takes place, and as the valve member 18 approaches what may be termed its final position of adjustment, the flapper 56 is also being moved in a clockwise direction toward what has been termed its normal position or relationship with respect to the nozzle 55, and when this normal relationship is reached, the pressure that has been thus established in the chamber 40 will be maintained and the valve member 18 will be thereby maintained in its newly adjusted position. In this instance, as in the previous instance, the adjusting movement of the valve member 18 will result in a slight change in the effective differential across the orifice 20, this change becomes immediately effective upon the computing or control means so as to be taken into account as the adjusting movement of the valve member 18 proceeds. Where the valve member is being opened, the resulting change in the pressure differential causes this differential to be slightly decreased as the opening movement of the valve 18 progresses, and this causes a slight further movement of the cam 71 in a counterclockwise direction so as to tend to cause a slight increase in the slope of the lever 90. This tendency is, however, applied at a time when the opening movement of the valve 18 is causing a decrease in the slope of the lever 90 so that the variable controlling factors that are effective to produce a flow through the valve are taken into account as the adjusting movements of the valve 18 progress. Hence the valve member 18 is moved to the required position of adjustment without hunting or overadjustment.

The control apparatus of the present invention as disclosed in Figs. 1, 2, 3, 7 and 8 may, of course, be utilized as a primary control means that is manually set by means of the adjusting mechanism 65 to attain a constant flow through a pipe line, but in other instances this control mechanism may be utilized as a secondary control means that is subservient to a primary control device that measures a condition that is to be maintained constant. When the control apparatus of this invention is to be used in such a way, the manual adjusting means 65 of Fig. 1 may be replaced by an automatic or power operated adjusting means 105 such as that shown in Fig. 7 of the drawings. This power operated adjusting means 105 as herein shown is pneumatic in character, and for mounting purposes, a bracket 106 is secured on the upright arm 31A in a position slightly below that in which the manual adjusting means is located in Fig. 1, and within this bracket 106 a bellows 107 is mounted so as to oppose an expansive coil spring 108. Between the bellows 107 and the coil 108 a mounting member or plate 109 is secured, and this mounting plate 109 extends upwardly through an opening 110 in the upper portion of the bracket. At its upper end, the mounting plate 109 is flanged at 111 and a member 60C is mounted thereon in a horizontal relationship. The member 60C has a mounting ear at its right-hand end in which the nozzle 55 is mounted so that when the bellows 107 is operated by pressure from a connected pressure duct 112, the nozzle 55 will be moved toward or away from the face of the flapper 56. The adjustment of the nozzle 55 that is thus effected corresponds to the adjustment that is applied thereto by the manual means 65 of Fig. 1. A slightly different arrangement of the pressure air ducts associated with the nozzle 55 is employed in the structure shown in Fig. 7, but the same functional relationship is maintained. The corresponding parts are therefore identified by the same reference characters with the suffix C added thereto in each instance.

Such a power operated adjusting means for the nozzle 55 may thus be governed by any desired primary control means such as a pressure measuring means, a temperature measuring means, or means for measuring any other condition that is to be controlled, and such measuring devices, where they are to be associated with a pressure operated or pneumatic adjusting means such as that of Fig. 7 must, of course, be arranged to exert their controlling action through the application of a pressure fluid such as air. One such instance where the control device of the present invention may be used as a secondary control means in association with a primary control device is found in those situations where the temperature of liquid contained in a tank is to be governed. Thus as shown in Fig. 6 of the drawings, a tank T may contain a liquid L to the level indicated, and this liquid may be heated by a heating medium such as hot water supplied from a pipe 16A to a heating coil 115 disposed within the tank. The pipe 16A has a control device 10D disposed therein, and this control device may be of the character disclosed in Fig. 1 of the drawings with the automatic, power actuated adjusting means 105 of Fig. 7 incorporated therein. The control device 10D in such an instance is utilized as a secondary control device that is dominated by a primary control device 116, this primary control device being in the nature of a temperature responsive means having a thermostatic element 117 disposed within the tank T so as to be subjected to the temperature of the liquid L. The temperature responsive primary control device 116 may constitute a pneumatic control of known character to which pressure is supplied from a constant pressure air source by a pipe 49D that has one branch 49D' extended to the control device 10D and a second branch 49D'' extended to the control device 116. The branch 49D' supplies the desired air pressure to the control device 10D in the same manner as the pipes 49 and 49C of Figs. 1 and 6 respectively, and the action of such air pressure is governed by the primary control device 116 through a connection 112D from the primary control device to the bellows 107, Fig. 7, such pipe 112D corresponding to pipe 112 of Fig. 6.

The operation of a temperature responsive primary control device such as that indicated at 116 is well understood in the art, and when a reduction in the temperature of the liquid L is sensed by the thermostat 116, the pressure that is effective in the pipe 112D is increased. This serves to move the nozzle 55 in a right-hand direction, Fig. 7 and this serves to increase the constant flow setting of the control device 10D. A similar but reverse action is attained when the temperature of the liquid L increases above a predetermined level. Thus so long as the temperature of the liquid L remains within the desired range, the setting of the constant flow control device 10D will remain the same, but if the constant flow of heating liquid that is thus passed through the heating coil 115 is too great or too small, a corresponding adjustment in the constant flow rate will be caused under the control of the primary control device 116. Thus it will be evident that the control device of the present invention is particularly adapted for association with a dominating primary control device, and that this association may be attained in a simple manner.

While the embodiment of the control device 10 as hereinbefore described employs a relatively simple multiplying lever means, it should be observed that other forms of multiplying lever means may be employed, and one such alternative embodiment for such multiplying lever means is illustrated in Figs. 4, 5 and 10 of the drawings. In this embodiment of the invention, the multiplying lever means are illustrated as being associated with a valve stem 125 that may form a part of a valve such as the valve 11 of Fig. 1, and the elements of the multiplying lever means are mounted in part upon the valve stem 125 and in part upon a stationary frame 131 that serves the same purposes as the frame 31 of Fig. 1. The frame 131 includes a stationary bracket 158 upon which a cam 171 is pivoted at 185, and such cam is actuated by differential pressure measuring means which may be of the kind shown in Fig. 1, such differential pressure measuring means being connected to the cam 171 by a link 184.

The operating power for actuating the valve stem 125 is controlled in this embodiment of the invention by a pneumatic flapper nozzle control couple that includes a nozzle 155 supported on a slide 160 in substantially the same manner as in Fig. 1. The pneumatic control couple also includes a flapper valve 156 that is pivotally supported at its upper end on a pivot 157 extended into the end of a supporting bar 157A carried on the frame 131. The flapper valve 156 extends downwardly from its pivot 157, and a torsion spring 159 acting between the supporting bar 157A and the flapper valve 156 serves normally to urge the flapper valve 156 in a counterclockwise direction as viewed in Fig. 4 so as to tend to close the opening in the nozzle 155. The flapper valve 156 extends for a substantial distance downwardly beyond the nozzle 155 so that the flapper valve may be engaged by a pin 195 carried on the upper end of a lever 190. The lever 190 is pivoted at 193 on a supporting bar 193A that extends from the frame 131, and by rocking movement of the lever 190, the flapper valve 156 may be moved toward and away from a normal relationship with respect to the nozzle 155, thereby to induce adjusting movements of the valve stem 125 in the same manner as hereinbefore described with respect to Fig. 1, and upon return of the flapper 156 to the normal relationship with respect to the nozzle 155, the valve stem 125 and the associated valve member will be maintained in the newly adjusted position.

The multiplying lever system whereby such movements of the lever 190 are effected is arranged so as to be responsive to the position of the valve stem 125, or in other words so as to be responsive to the effective valve area or opening, and such lever means are also responsive to the pressure differential that is effective across such valve opening. In attaining this action, the lever means are so arranged that when the valve member 125 is in its fully closed position, changes in differential pressure will be ineffective upon the flapper valve 156, and when there is no pressure differential, the movements of the valve stem 125 will be ineffective upon the flapper valve 156. In attaining such relationship, a bell crank 102 is pivoted at 103 on a stationary support 104 that may be extended from the frame 131, and this bell crank has an upwardly extending arm 105 and a horizontallly extending arm 106. The upwardly extending arm 105 has a follower pin 107 extended laterally therefrom so that it may be engaged by the leading surface 187 of the cam 171, and the follower 107 is held in engagement with the leading surface 187 of the cam by a coil spring 108 that acts between the support 193A and the end of the arm 106 of the bell crank. The end of the arm 106 has a rigid and generally horizontal link 109 pivoted thereto at 110, and the other end of the link 109 is pivoted at 111 to the upper end of a generally vertical link 112. The lower end of the link 112 is supported on a pivot pin 113 that is mounted on the valve stem 125 by a supporting collar 114, so that the link 112 is moved vertically as the valve member is adjusted. The upper end of the link 112 is also operatively associated or connected to the lower end of the lever arm 190 and this is effected by a generally horizontal link 115 that is pivoted at one end on the pivot 111 and is pivoted at its other end to the lower end of the lever 190 by a pivot pin 116.

The arrangement of the lever system that is thus afforded is such that when the valve member is in its fully closed position, and when there is no pressure differential effective across the valve orifice, the pivot 103 of the bell crank 102 and the pivot 111 will be in alignment, and the pivot pins 110 and 116 will be in alignment. When the valve is partially opened and a pressure differential is effective on the cam 171, this aligned relationship of the two sets of pivots 103—111 and 110—116 will be disturbed or changed as indicated in Fig. 5 of the drawings, and this results in production of a relationship whereby the equation of flow will be solved by the lever system in accordance with the effective pressure differential and the effective area of the valve orifice. As an example, let it be assumed that a change in the effective pressure differential moves the cam 171 in a clockwise direction from the position shown in Fig. 5. When this occurs, the bell crank 102 will be rocked in a counterclockwise direction about its pivot 103 and, assuming for the moment that the valve stem 125 remains in its same vertical position, the aforesaid counterclockwise movement of the bell crank 102 will move the link 109 slightly to the right. Such movement will be transmitted by the link 115 to the lower end of the lever 190 and the pin 195 will therefore act to move the flapper valve 156 away from the nozzle 155. This will cause further dissipation of air pressure from the pressure chamber of the valve operating means, such as the chamber 40 of Fig. 1, with the result that the valve stem 125 and the associated valve member will be moved in a valve closing direction. As such valve closing or upward movement of the valve stem 125 progresses the link 112 will be correspondingly moved in an upward direction, and assuming for the moment that the bell crank 102 now remains stationary, such upward movement of the link 112 will pivot the link 109 about the pivot 110 so as to impart a slight right-hand movement to the pivot 111. Such right-hand movement will be transmitted through the link 115 to the lower end of the lever 190, thereby to tend to impart further separating movement to the flapper valve 156. However, the vertical component of movement of the pivot 111 predominates so that the pivot 116 moves to the left as the valve closing movement progresses, and hence the flapper valve 156 is caused to move gradually in a right-hand direction toward its normal relationship with respect to the nozzle 155. When this normal relationship is reached, the adjusting movements of the valve stem 125 will be terminated, and the valve member will be retained in its newly adjusted position. In this arrangement as shown in Figs. 4 and 5, there will, of course, be compensating movements of the parts in the same manner as in the previously described embodiment, for in this embodiment also, the variations of the effective valve opening during such adjustment will vary the pressure differential in the hereinbefore described manner.

In the embodiment of the invention shown in Figs. 4, 5 and 10, the elements of the lever system as well as the pressure differential measuring means must, of course, be coordinated to enable the flow to be calculated and manifested for all variations of pressure and effective valve area that will be encountered in the proposed use of the control apparatus, and a typical way in which the proportioning and relationship of the parts may be determined is illustrated in Fig. 10 of the drawings. In this illustrative exmaple it is assumed that the cam 171 and the related pressure differential measuring means are operable to afford a mechanical representation of the square root of the detected pressure differential, and such representation by the cam surface 187 results in movement of the pivot point 110 along an arcuate path represented by the linearly calibrated scale A—B in Fig. 10. This serves, of course, to position the left-hand end of the lever 109, while the right-hand end of this lever, as defined by the pivot 111, is located in a position that is determined by the vertical location or adjustment of the valve stem 125. It will be recognized that where the scale A—B represents the square root of the pressure differential on a linear scale, the resulting flow scale will also be linear in character and may be laid off on the arcuate path A—C of the pin 116 by determining the "100" point and the other points of the flow scale A—C from the fixed values of the scale A—B and the other fixed values such as the valve stroke and the lengths of the various links and levers. To do this, arcs 201 of a radius equal to the length of the link 115 are swung from the various points on the scale A—B; and these arcs indicate the paths of the pivot 111 for the respective related values on the scale A—B, and such relationship has been indicated by values along the line A'—B'. The open and closed positions D and E of the valves are then located along a vertical line positioned in a relationship similar to the location of the valve stem 125, this position being such that an arc 202 of a radius equal to the length of the link 112, and swung about the closed valve position on the scale D—E, will pass through the pivot point 103. A similar arc 203 centered on the lower or "100" position of the line D—E will then define path of the pivot 111 when the valve member is in its fully open position. Thus, the arc 203 intersects the various arcs 201, and by striking arcs, of a radius equal to the length of the link 115, from such points of intersection, the points of the same value along the scale A—C will be located in each instance. After the flow scale A—C has been thus developed, arcs 205 of a radius equal to the length of the link 115 are swung from the various points on the flow scale A—C so as to intersect with the arcs 202 and 203, and the points where the arcs 205 intersect with the "100" arc of the arcs 201 serve to define points from which the intermediate values of the scale D—E may be determined. Thus, an arc of a radius equal to the length of the link 112 is swung from each such point of intersection of an arc 205 with the "100" arc of the arcs 201, and such arcs intersect the scale D—E to define points of corresponding value. The scale D—E is then utilized in accordance with known practice in valve design to determine the form of the valve member that is to be associated with the valve stem 125.

From the foregoing description it will be evident that the present invention enables constant flow in a pipe line or the like to be attained in a simple and expeditious manner such that the insertion of a single fitting or unit in the pipe line is required. Moreover, it will be clear that the flow control means of the present invention is responsive directly to the factors that govern flow through the valve and hence the response of the present control apparatus is accurate and rapid. Furthermore, the control apparatus of the present invention is of such a character as to be accurately operative over a wide range of detected pressure differentials, and this apparatus may be readily utilized either as a primary or secondary control means as the circumstances of use may dictate.

Thus, while I have illustrated and described preferred embodiments of the invention, it is to be understood that these are capable of variation and modification and I therefore do not wish to be limited to the precise details set forth but desire to avail myself of such changes and alterations as fall within the purview of the following claims:

I claim:

1. In a flow control apparatus, a valve having a valve orifice and an adjustable valve member for variably adjusting the effective area of said orifice, pressure differential measuring means associated with said valve and operable to afford a mechanical representation of the pressure differential effective across said orifice, computing means conjointly controlled by the position of said valve member and by the mechanical representation of the pressure differential to compute and manifest the instantaneous flow rate through said orifice, power means for selectively moving said valve member in opening or closing directions, governing means settable for a desired flow rate and associated with said power means for causing operation thereof selectively in valve-opening or valve-closing directions, and means operatively associating said computing means with said governing means to cause corrective adjustment of said valve member when the manifested instantaneous flow varies from the desired flow for which said governing means are set.

2. In a flow control apparatus, a flow control valve having a valve orifice and an adjustable valve member for varying the effective area of said orifice, pressure differential measuring means operable to measure the pressure differential effective across said orifice and including an element affording a mechanical representation of a function of the effective differential, power operated means for adjusting said valve to vary the effective area of said orifice and having an element associated therewith affording a mechanical representation of a function of the effective area of the orifice, means responsive conjointly to the mechanical representations thus afforded to compute and afford a mechanical representation of the instantaneous flow through said orifice, and governing means for said power means settable according to a predetermined flow scale to indicate the flow desired through said valve and responsive to such mechanical representation of the instantaneous flow to adjust said valve member to a position wherein the computed mechanical representation of the instantaneous flow corresponds with the desired flow indicated by the setting of said governing means.

3. In a flow control apparatus, a flow control valve having a valve orifice and an adjustable valve member for varying the effective area of said orifice, pressure responsive means operable to measure the pressures on the opposite sides of said orifice, power operated means for adjusting said valve to vary the effective area of said orifice and having an element associated therewith affording a mechanical representation of a function of the effective area of the orifice, computing means responsive conjointly to said pressure responsive means and to the mechanical representation to compute and afford a mechanical representation of the instantaneous flow through said orifice, and governing means for said power means settable according to a predetermined flow scale to indicate the flow desired through said valve and responsive to such mechanical representation of the instantaneous flow to adjust said valve member to a position wherein the mechanical representation of the instantaneous flow corresponds with the desired flow indicated by the setting of said governing means.

4. In a flow control apparatus for regulating the flow of a fluid through a pipe line or the like, a valve adapted to be mounted in such a pipe line and having a valve orifice and an adjustable valve member for variably adjusting the effective area of said orifice, measuring means associated with said valve and operable to measure and afford mechanical representations of all of the variable factors affecting flow of such fluid through said orifice, computing means conjointly controlled by the mechanical representations thus afforded to compute and manifest the instantaneous flow rate of such fluid through said orifice, power means for selectively moving said valve member in opening or closing directions, governing means settable for a desired flow rate and associated with said power means for causing operation thereof selectively in valve-opening or valve-closing directions, and means operatively associating said computing means with said governing means to cause corrective adjustment of said valve member when the manifested instantaneous flow varies from the desired flow for which said governing means are set.

5. In a flow control apparatus, a flow control valve having a valve casing with inlet and outlet openings and having means defining a valve orifice between said openings, an adjustable valve member for varying the effective area of said orifice, a supporting frame mounted on said valve casing, pressure differential measuring means mounted on said frame and operable to measure the pressure differential effective across said orifice and including an element affording a mechanical representation of a function of the effective differential, power operated means mounted on said supporting frame for adjusting said valve to vary the effective area of said orifice and having an element associated therewith affording a mechanical representation of a function of the effective area of the orifice, computing means mounted on said supporting frame and responsive conjointly to the mechanical representations thus afforded to compute and afford a mechanical representation of the instantaneous flow through said orifice, and governing means for said power means on said supporting frame settable according to a predetermined flow scale to indicate the flow desired through said valve and responsive to such mechanical representation of the instantaneous flow to adjust said valve member to a position wherein the mechanical representation of the instantaneous flow corresponds with the desired flow indicated by the setting of said governing means.

6. In a flow control apparatus, a valve having a valve casing with inlet and outlet openings and having a division wall disposed between said inlet and outlet openings and having a valve orifice formed in said wall, a valve member for varying the effective area of said orifice, an operating member connected to said valve member for actuating the same and affording by its position a mechanical representation of the effective area of the orifice, power operated actuating means connected to said operating member and operable to actuate said valve member, selectively in opening or closing directions, governing means governing said power operated actuating means and including an adjustable stationary element settable along a predetermined flow scale to represent the flow rate that is desired, and also including a shiftable governing element cooperating with said stationary element and having a normal position with respect to said stationary element in which said actuating means is rendered effective to maintain the valve member against movement and having positions on opposite sides of said normal position in which said power means is rendered operable selectively to move said valve member in opening or closing directions, pressure differential measuring means connected to said valve casing on opposite sides of said wall to measure the pressure differential effective across said valve orifice, means associated with said pressure differential measuring means and operable thereby to afford a mechanical representation of the square root of the pressure differential effective across said valve orifice, and multiplying lever means subjected to and controlled jointly by the mechanical representations of the effective area of said orifice and the effective pressure differential thus afforded to actuate and control said shiftable element of said governing means to maintain said shiftable element in said normal position when the effective valve orifice times the square root of the effective pressure differential equals the desired flow rate for which said stationary element is set and to actuate said shiftable element to cause corrective opening or closing movement of said valve member selectively when variation of the effective valve orifice or the effective differential occurs.

7. In a flow control apparatus, means affording a valve orifice and an adjustable valve member for varying the effective area of said orifice, an operating member connected to said valve member for actuating the same and affording by its position a mechanical representation of the effective area of the orifice, power operated actuating means connected to said operating member and operable to actuate said valve member selectively in opening or closing directions, governing means controlling said power operated actuating means and including an adjustable stationary element settable along a predetermined flow scale to represent the flow rate that is desired, and also including a shiftable governing element cooperating with said stationary element and having a normal position with respect to said stationary element in which said actuating means is rendered effective to maintain the valve member against movement and having positions on opposite sides of such a normal position in which said power means is rendered operable selectively to move said valve member in opening or closing directions, pressure differential measuring means connected to said valve casing on opposite sides of said valve orifice to measure the pressure differential effective across said valve orifice and operable to afford a mechanical representation of the square root of the pressure differential effective across said valve orifice, and means subjected to and controlled conjointly by the mechanical representations of the effective orifice and the effective pressure differential thus afforded to actuate and control said shiftable element of said governing means to maintain said shiftable element in said normal position when the effective valve orifice times the square root of the effective pressure differential equals the desired flow rate for which said stationary element is set and to actuate said shiftable element to cause corrective opening or closing movement of said valve member selectively when variation of the effective valve orifice or the effective differential occurs.

8. In a flow control apparatus, a valve having a valve casing with inlet and outlet openings and having a division wall disposed between said inlet and outlet openings and having a valve orifice formed in said wall, a valve member for varying the effective area of said orifice, power operated actuating means connected to said valve member and operable to actuate said valve member selectively in opening or closing directions and including a part affording by its position a mechanical representation of the effective area of the orifice, pressure differential measuring means connected to said valve casing on opposite sides of said division wall to measure the pressure differential effective across said valve orifice, means associated with said pressure differential measuring means and operable thereby to afford a mechanical representation of a function of the pressure differential effective across said valve orifice, multiplying lever means subjected to and controlled jointly by the mechanical representations of the effective area of said orifice and the effective pressure differential thus afforded and operable to afford a representation of a function of the instantaneous flow through said orifice, governing means for said power actuating means settable along a predetermined flow scale for any desired flow, and operable to govern said power means to adjust said valve member, and means affording a connection between said multiplying lever means and said governing means to cause corrective opening or closing movement of said valve member selectively when the representation of flow afforded by said lever means differs from the flow rate for which said governing means is set.

9. In a flow control apparatus, a valve having a valve casing with inlet and outlet openings and having a division wall disposed between said inlet and outlet openings and having a valve orifice formed in said wall, a valve member for varying the effective area of said orifice, power operated actuating means connected to said valve member and operable to actuate said valve member selectively in opening or closing directions and including a part affording by its position a mechanical representation of the effective area of the orifice, pressure measuring means connected to said valve casing on opposite sides of said division wall to measure the pressures effective on opposite sides of said valve orifice, multiplying lever means subjected to and controlled jointly by the mechanical representation of the effective area of said orifice and said pressure measuring means and operable to afford a representation of a function of the instantaneous flow through said orifice, governing means for said power actuating means settable along a predetermined flow scale for any desired flow, and operable to govern said power means to adjust said valve member, and means affording a connection between said multiplying lever means and said governing means to cause corrective opening or closing movement of said valve member selectively when the representation of flow afforded by said lever means differs from the flow rate for which said governing means is set.

10. In a flow control apparatus, a valve having a valve orifice and an adjustable valve member for variably adjusting the effective area of said orifice, pressure differential measuring means associated with said valve, cam means operated by said pressure differential measuring means to afford a mechanical representation of the square root of the pressure differential effective across said orifice, computing means coordinated with the form and orifice adjusting characteristics of said valve member and conjointly controlled by the position of said valve member and by the mechanical representation of the pressure differential afforded by said cam to compute and manifest the instantaneous flow rate through said orifice, power means for selectively moving said valve member in opening or closing directions, governing means settable for a desired flow rate and associated with said power means for causing operation thereof selectively in valve-opening or valve-closing directions, and means operatively associating said computing means in a controlling relationship with respect to said governing means to cause corrective adjustment of said valve member by said power means when the instantaneous flow manifested by said computing means varies from the desired flow for which said governing means are set.

11. In a flow control apparatus, a flow control valve having a valve orifice and an adjustable valve member for varying the effective area of said orifice, pressure differential measuring means operable to measure the pressure differential effective across said orifice and including an element affording a mechanical representation of a function of the effective differential, power operated means for adjusting said valve to vary the effective area of said orifice and having an element associated therewith affording a mechanical representation of a function of the effective area of the orifice, lever means having differently located points of operative connection with the two mechanical representations thus afforded and operable to compute and afford at another location a mechanical representation of the instantaneous flow through said orifice, and governing means for said power means settable according to a predetermined flow scale to indicate the flow desired through said valve and responsive to such mechanical representation of the instantaneous flow to adjust said valve member to a position wherein the computed mechanical representation of the instantaneous flow corresponds with the desired flow indicated by the setting of said governing means.

ALFRED W. PETT.